United States Patent
Miyamoto et al.

(10) Patent No.: US 10,662,083 B2
(45) Date of Patent: May 26, 2020

(54) FILTER

(71) Applicant: TORAY INDUSTRIES, INC., Tokyo (JP)

(72) Inventors: Ryoma Miyamoto, Shiga (JP); Keisuke Yoneda, Ehime (JP); Kumiko Ogawa, Shiga (JP); Satoko Kanamori, Shiga (JP); Ryuichiro Hiranabe, Shiga (JP); Yoichiro Kozaki, Shiga (JP)

(73) Assignee: TORAY INDUSTRIES, Tokyo (JP)

( * ) Notice: Subject to any disclaimer, the term of this patent is extended or adjusted under 35 U.S.C. 154(b) by 0 days.

(21) Appl. No.: 16/489,278

(22) PCT Filed: Feb. 28, 2018

(86) PCT No.: PCT/JP2018/007652
§ 371 (c)(1),
(2) Date: Aug. 27, 2019

(87) PCT Pub. No.: WO2018/159723
PCT Pub. Date: Sep. 7, 2018

(65) Prior Publication Data
US 2020/0062616 A1 Feb. 27, 2020

(30) Foreign Application Priority Data
Feb. 28, 2018 (JP) .................. 2017-036090

(51) Int. Cl.
*C02F 1/42* (2006.01)
*B01D 15/36* (2006.01)
(Continued)

(52) U.S. Cl.
CPC .............. *C02F 1/42* (2013.01); *B01D 15/362* (2013.01); *B01D 39/083* (2013.01);
(Continued)

(58) Field of Classification Search
CPC ........ C02F 1/28; C02F 1/42; C02F 2001/425; C02F 2201/006; B01D 15/00;
(Continued)

(56) References Cited

U.S. PATENT DOCUMENTS 3,213,016 A * 10/1965 Gowers .................... C08J 5/22
210/638
2012/0298570 A1 11/2012 Osawa et al.
(Continued)

FOREIGN PATENT DOCUMENTS

CN 102781539 A 11/2012
JP 62-68509 A 3/1987
(Continued)

OTHER PUBLICATIONS

International Search Report, issued in PCT/JP2018/007652, PCT/ISA/210, dated Jun. 5, 2018.
(Continued)

*Primary Examiner* — Matthew O Savage
(74) *Attorney, Agent, or Firm* — Birch, Stewart, Kolasch & Birch, LLP (57) ABSTRACT

The present invention provides a filter which, even when raw water is subjected to high-speed treatment, enables achieving a high solute rejection ratio and a long solute filtration life and which exhibits a low water flow resistance. The present invention pertains to a filter obtained by laminating woven fabrics or knitted fabrics, the filter being characterized in that: said woven fabrics or knitted fabrics comprise a fiber capable of adsorbing components dissolved in liquid: said fiber has a diameter of 100-600 μm; the woven fabrics or knitted fabrics have a porosity of 15-70%; and variation in area porosity in the thickness direction of the laminate is 15% or less.

8 Claims, 2 Drawing Sheets

(51) Int. Cl.
  *B32B 5/02* (2006.01)
  *B32B 5/26* (2006.01)
  *B01J 47/127* (2017.01)
  *B01J 39/20* (2006.01)
  *B01J 39/07* (2017.01)
  *B01D 39/08* (2006.01)
  *B01D 39/16* (2006.01)

(52) U.S. Cl.
  CPC .......... *B01D 39/1684* (2013.01); *B01J 39/07* (2017.01); *B01J 39/20* (2013.01); *B01J 47/127* (2017.01); *B32B 5/024* (2013.01); *B32B 5/026* (2013.01); *B32B 5/26* (2013.01); *B32B 2250/20* (2013.01); *B32B 2250/244* (2013.01); *B32B 2262/0284* (2013.01); *B32B 2307/726* (2013.01); *C02F 2001/425* (2013.01); *C02F 2201/006* (2013.01)

(58) Field of Classification Search
  CPC .... B01D 15/36; B01D 15/362; B01D 39/083; B01D 39/1684; B01J 39/07; B01J 39/20; B01J 47/127; B32B 5/024; B32B 5/026; B32B 5/26; B32B 2250/20; B32B 2250/244; B32B 2262/0284; B32B 2307/726

USPC .......................... 210/491, 497.1, 499, 502.1
See application file for complete search history.

(56) References Cited

U.S. PATENT DOCUMENTS

2015/0107206 A1    4/2015  Sakashita et al.
2019/0217286 A1*   7/2019  Miyamoto ............... B01J 39/20

FOREIGN PATENT DOCUMENTS

| JP | 2001-514060 A | 9/2001 |
| JP | 2001-321619 A | 11/2001 |
| JP | 2002-1345 A | 1/2002 |
| JP | 2002-235247 A | 8/2002 |
| JP | 2012-40526 A | 3/2012 |
| WO | WO 99/10278 A1 | 3/1999 |
| WO | WO 2013/146499 A1 | 10/2003 |

OTHER PUBLICATIONS

Written Opinion of the International Searching Authority, issued in PCT/JP2018/007652, PCT/ISA/237, dated Jun. 5, 2018.
Chinese Office Action and Search Report for Chinese Application No. 201880013896.3, dated Feb. 25, 2020, with English translation.

* cited by examiner

FILTER

TECHNICAL FIELD

The present invention relates to a filter capable of adsorbing components dissolved in liquids.

BACKGROUND ART

A filter including stacked layers of a fibrous adsorbent has been proposed as a means for adsorptively removing components dissolved in liquids.

Patent Document 1 discloses a filter medium obtained by processing ion-exchange fibers for removing ions in water into nonwoven fabric, followed by stacking.

Patent Document 2 discloses knitted fabric of fibrous activated carbon for removing impurities in liquids.

Patent Document 3 discloses a filter obtained by forming a fibrous adsorbent for removing Na ions or the like in water into woven or knitted fabric and winding the fabric around a perforated core.

CITATION LIST

Patent Literature

Patent Document 1: JP-A-S62-68509
Patent Document 2: JP-A-2002-235247
Patent Document 3: JP-A-2012-040526

SUMMARY OF INVENTION

Technical Problem

The woven or knitted fabric of a fibrous adsorbent described above has a certain degree of adsorbing ability, but fiber diameter or size of interstices is not controlled. Although the rate of adsorption may be heightened by reducing the fiber diameter and a prolongation of filtration life with a limited packing space may be attained by heightening the degree of packing with the adsorbent, all these measures increase the water-passing resistance during liquid filtration. It is hence impossible with prior-art technique to attain all of high adsorption rate, prolonged filtration life, and low water-passing resistance.

An object of the present invention is to provide a filter having reduced water-passing resistance, a high removal ratio, and a long filtration life.

Solution to Problem

The filter of the present invention for attaining the above object is as below.

(1) A filter including at least one of a stacked woven fabric, stacked knitted fabric and a wound fiber body.
the woven fabric, the knitted fabric and the wound fiber body satisfying the following requirements (a) and (b):
(a) containing a fiber capable of adsorbing a component dissolved in a liquid; and
(b) the fiber having a diameter D of 100 μm or more and 600 μm or less.
and the filter satisfying the following requirements (c) and (d):
(c) having a porosity of 15% or more and 70% or less; and
(d) having a variation in an areal porosity of 15% or less, in a stack thickness direction in a case when the filter includes the woven fabric or knitted fabric, or in a radial direction in a case when the filter includes the wound fiber body.

(2) A filter for liquid filtration, including at least one of a stacked woven fabric, stacked knitted fabric and a wound fiber body,
the woven fabric, the knitted fabric and the wound fiber body satisfying the following requirements (a) and (b):
(a) containing a fiber capable of adsorbing a component dissolved in a liquid; and
(b) the fiber having a diameter D of 100 μm or more and 600 μm or less.
and the filter satisfying the following requirements (c) and (d):
(c) having a porosity of 15% or more and 70% or less; and
(d) having a variation in an areal porosity of 15% or less in a direction along which the liquid is filtered.

(3) The filter according to the above (1) or (2), in which the woven fabric or knitted fabric has a basis weight of 300 $g/m^2$ or more and 1,500 $g/m^2$ or less.

(4) The filter according to any one of the above (1) to (3), including a woven fabric that satisfies the above (a) to (c) and satisfies the following expression:

$$0.5 \leq op/D \leq 3.0 \tag{1}$$

op: opening size of the woven fabric (μm)
D: fiber diameter (μm).

(5) The filter according to any one of the above (1) to (4), in which the fiber in a wet state has a density of 1.0 $g/cm^3$ or more and 1.50 $g/cm^3$ or less.

(6) The filter according to any one of the above (1) to (5), in which the fiber has ion-exchange ability.

(7) A water purifier including the filter according to any one of the above (1) to (6).

(8) A method for purifying water, including passing the water through the filter according to any one of the above (1) to (6).

The above filter can be used in a water purifier or in a method for purifying water.

Advantageous Effects of Invention

Since the filter of the present invention has a fiber diameter D of 100 μm or larger, the stacked sheets of woven or knitted fabric and the wound body can retain interstices among the fibers and, hence, water-passing resistance is reduced. Since the fiber diameter D is 600 μm or less, the fibers can have an increased area for contact with raw water and an increase in adsorption rate can be attained. Furthermore, since the porosity ε is 15% or higher, the filter is less apt to suffer clogging during water passing and is less apt to have increased water-passing resistance. Since the porosity ε is 70% or less, the raw water being supplied to the filter does not short-cut and a component to be removed from the raw water can be advantageously removed. Moreover, since the areal porosity has a variation of 15% or less, eddy currents are less apt to occur in water passing and the water-passing resistance can be kept low.

DESCRIPTION OF EMBODIMENTS

1. Fibers

The fibers explained below can adsorb components dissolved in liquids. Namely, the "fiber" is a "fibrous adsorbent". The term "fiber" means a conception which includes yarns, woven fabric, knitted fabric, and a wound body. The yarns are ones which constitute the woven fabric, knitted fabric, and wound body.

The components dissolved in liquids are "solutes" dissolved in solvents such as water and organic solvents, and are components to be recovered or removed.

The fiber diameter (diameter of the yarns) D is 100 μm or larger, preferably 200 μm or larger, more preferably 300 μm or larger. The fiber diameter D is 600 μm or less, preferably 500 μm or less, even more preferably 450 μm or less. Since the fiber diameter D is 100 μm or larger, the stacked sheets of woven or knitted fabric and the wound body can retain interstices among the fibers and, hence, reduced water-passing resistance can be attained. Meanwhile, since the fiber diameter D is 600 μm or less, the fibers can have an increased area for contact with raw water and an increase in adsorption rate can be attained.

In cases when the fibers (yams) are monofilaments, the fiber diameter D is the diameter of the monofilament. In cases when the fibers (yams) are multifilaments, the fiber diameter D is the diameter of a bundle which is configured of a plurality of filaments constituting one multifilament.

Examples of the fibers capable of adsorbing components dissolved in liquids include cation-exchange fibers capable of removing cations dissolved in water. Cation-exchange fibers include a fiber structure and a crosslinked high-molecular-weight compound which is adherent to the surface of the fiber structure and has ion-exchange groups. Specifically, the cation-exchange fibers may satisfy at least either of the following: (1) there is a crosslinked high-molecular-weight compound which covers the surface of the fiber structure; and (2) a crosslinked high-molecular-weight compound is present in interstices among a plurality of fiber structures.

The "fiber structure" corresponds to the core of the "fibers (fibrous adsorbent)" and by itself generally has a slender shape called a "fiber". As the fiber structure, use can be made of synthetic fibers such as polyolefins. e.g., polyethylene and polypropylene, polyesters, e.g., poly(ethylene terephthalate) and polycarbonates, polyamides, aromatic polyamides, acrylics, polyacrylonitrile, and halogenated polyolefins, e.g., poly(vinyl chloride), PTFE, and poly(vinylidene fluoride), natural fibers such as wool, silk, and cotton, and a mixture thereof obtained by mixed spinning or by fiber mixing. Especially preferred of these fibers for use as a fiber structure are polyamides and polyesters. Nylons are especially preferred polyamides, and poly(ethylene terephthalate) (PET) is an especially preferred polyester.

The crosslinked high-molecular-weight compound having ion-exchange groups is preferably a gel in which the compound contains cation-exchange groups, such as sulfonate groups, carboxy groups, or phosphate groups, or anion-exchange groups, such as quaternary ammonium salt groups or tertiary amino groups in the molecule, and has a three-dimensional network structure formed by crosslinking the molecular chains at many sites by covalent bonds and which is insoluble in solvents, such as water and organic solvents, but retains a solvent absorbed therein. Namely, the crosslinked high-molecular-weight compound may form a gel layer.

The crosslinked high-molecular-weight compound having ion-exchange groups is formed, for example, by a crosslinking reaction between a high-molecular-weight compound having carboxy groups and a compound having two or more functional groups which react with carboxy group.

The high-molecular-weight compound having carboxy groups is a compound having a plurality of carboxy groups in the molecule, and examples thereof include homopolymers and copolymers of acrylic acid and methacrylic acid and polymers obtained by hydrolyzing copolymers of an acrylic ester, a methacrylic ester, and maleic anhydride.

The compound having two or more functional groups which react with carboxy group is a compound having in the molecule a plurality of functional groups, e.g., hydroxyl, amino, glycidyl, oxazoline, or carbodiimide groups, which each react with a carboxy group to form a covalent bond. Especially preferred are compounds having a plurality of highly reactive functional groups such as glycidyl, oxazoline, or carbodiimide groups. For example, a polyglycidyl compound is a compound containing two or more glycidyl groups in the molecule, and specific examples of the compound include Denacol EX-512 and EX-612, manufactured by Nagase ChemteX Corp. For example, a polyoxazoline is a compound containing two or more oxazoline groups in the molecule, and specific examples of the compound include Epocros WS-300, WS-500, and WS-700, manufactured by Nippon Shokubai Co., Ltd. For example, a polycarbodiimide is a compound containing two or more carbodiimide groups in the molecule, and specific examples of the compound include Carbodilite V-02. SVSV-02, and V-10, manufactured by Nisshinbo Chemical Inc.

The ion-exchange fibers have an ion-exchange capacity of preferably 1.0 meq/g or higher, more preferably 1.5 meq/g or higher. In cases when it is 1.0 meq/g or higher, the ion-exchange fibers can have a life which renders the fibers practically usable. The ion-exchange capacity thereof is preferably 8.0 meq/g or less, more preferably 6.0 meq/g or less. In cases when the ion-exchange capacity thereof is 8.0 meq/g or less, the crosslinked high-molecular-weight compound having ion-exchange groups is inhibited from swelling excessively and, hence, clogging during water passing is less apt to occur.

3. Wound Body

The fibers may be applied to a wound body. The term "wound body" means fibers which have been wound around an axis or a core as the center. The term "axis" and "core" mean the center of winding (virtual center). Namely, the fibers may have been wound around another member (core), but the core is not essential.

In the wound body, the "fibers" may be woven fabric or knitted fabric or may be yarns which have been neither woven nor knitted. The woven or knitted fabric may have the configuration which will be described later.

The wound body can have any of various external shapes such as, for example, a cylinder, a prism such as a triangular prism or a quadrangular prism, a cone, a pyramid such as a triangular pyramid or a quadrangular pyramid, a sphere, and an ellipsoid.

The wound body may have a hollow inside. The hollow may lie in the center of the winding.

In the wound body, the fibers may have been wound around a core, which is a member other than the fibers. Namely, a core may be disposed at the center of the winding. The external shape of the core also can be any of various shapes like the external shape of the wound body.

Figure 1:
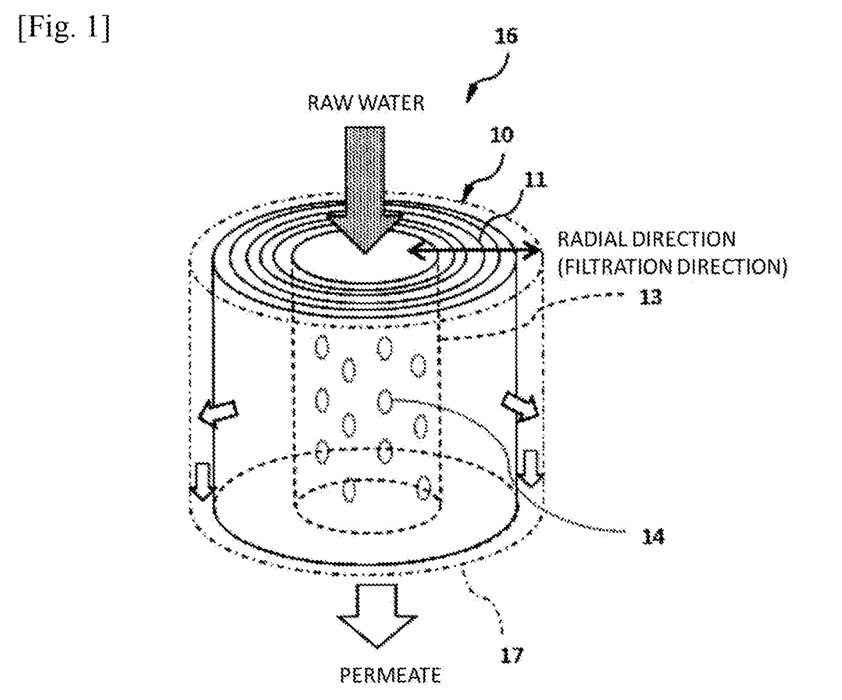
FIG. 1 is a schematic view illustrating an example of the filter including a wound fiber body.

The hollow may lie in the core. Examples of the core having a hollow include hollow members or porous members. A specific example is illustrated in FIG. 1 and will be described later in detail.

2. Woven Fabric and Knitted Fabric

The woven or knitted fabric including the fibrous adsorbent is packed into a column, and an even structure can be easily formed thereby. As a result, a reduced pressure loss during water passing can be attained. Woven fabric is more preferable than knitted fabric because of the higher structure evenness thereof and is more effective in reducing the pressure loss during water passing.

Examples of the woven fabric include the three foundation weaves including plain weave, twill weave, and satin weave, derivative weaves including derivative weave and modified twill weave, half double weaves such as warp double weave and weft double weave, warp pile weaves including warp velvet, towel, and velour, and weft pile weaves including velveteen, weft velvet, velvet, and corduroy. Woven fabric having these weaves can be produced by ordinary methods using ordinary weaving machines including a rapier weaving machine and an air-jet weaving machine.

Figure 3:
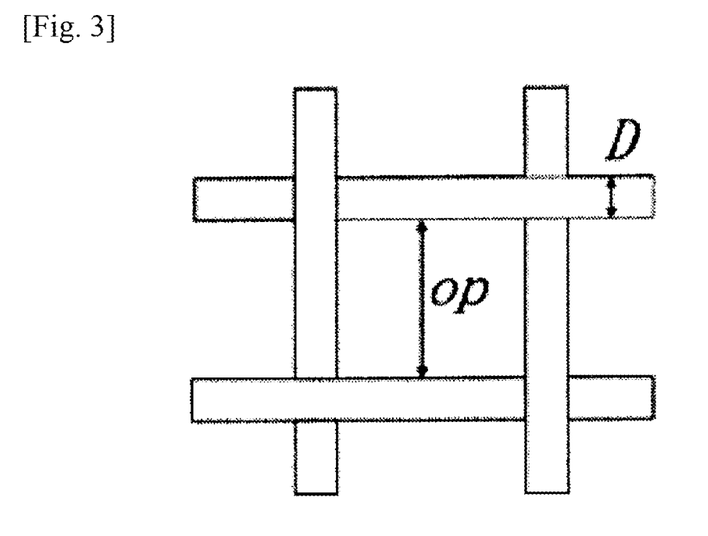
FIG. 3 is a schematic view illustrating an opening size (op) and a fiber diameter D.

There is opening size (hereinafter referred to as "op"; see FIG. 3) as a value which indicates the distance between the fibers (yams) or fiber bundles (yarn bundles) which constitute the woven or knitted fabric. The opening size is defined by the following equation.

$$op(\mu m) = \{25,400/n(\text{per inch})\} - D$$

n (per inch): number of meshes per inch of the woven or knitted fabric

D: diameter of the fibers (diameter of the yarns) ($\mu m$) constituting the woven or knitted fabric The value of op/D, obtained by dividing the opening size by the fiber diameter (yam diameter), is preferably 0.5 or larger, more preferably 0.7 or larger, even more preferably 0.8 or larger. The value of op/D is preferably 3.0 or smaller, more preferably 2.5 or smaller, even more preferably 2.0 or smaller. In cases when op/D is 0.5 or larger, this fabric is less apt to be clogged in water passing and is less apt to have increased water-passing resistance. In cases when op/D is 3.0 or less, raw water, when passed through the filter, does not short-cut and a component to be removed from the raw water can be advantageously removed.

The knitted fabric is not particularly limited in the kind thereof, and may be weft knitted fabric or warp knitted fabric. Preferred examples of structures of weft knitting include plain stitch, rib stitch, interlock stitch, purl stitch, tack stitch, float stitch, half cardigan stitch, lace stitch, and plating stitch. Preferred examples of structures of warp knitting include single denbigh stitch, single atlas stitch, double cord stitch, half tricot stitch, fleecy stitch, and jacquard stitch. Such knitted fabric can be produced by knitting by ordinary methods using ordinary knitting machines such as a circular knitting machine, weft knitting machine, tricot machine, and raschel machine.

The basis weight of the woven or knitted fabric is preferably 300 g/m² or higher, more preferably 350 g/m² or higher, even more preferably 400 g/m² or higher. The basis weight thereof is preferably 1,500 g/m² or less, more preferably 1,000 g/m² or less, even more preferably 800 g/m² or less. In cases when the basis weight of the woven or knitted fabric is 300 g/m² or higher, this fabric gives a filter in which raw water does not short-cut and a component to be removed from the raw water can be advantageously removed. In cases when the basis weight thereof is 1,500 g/m² or less, this fabric is less apt to be clogged and can have reduced water-passing resistance during water passing.

3. Filter

The filter according to this embodiment includes at least one of a stack of sheets of woven or knitted fabric and a wound fiber body.

With respect to the filter including a wound body, configurations other than those which have been explained above are described below. In particular, filters configured so that feed water passes through a core are explained as examples below.

The material of the core of the wound body may be any material so long as water can pass therethrough. For example, a synthetic resin is applied. Specifically, polyolefins such as polyethylene and polypropylene or fluororesins such as PTFE and PFA are suitable.

The core may have a diameter (outer diameter) which is preferably 5 mm or larger or 20 mm or larger and is preferably 50 mm or less or 40 mm or less. The core is not particularly limited in the length thereof, but the length thereof is, for example, 80 mm or larger and 500 mm or less.

It is preferable that the ends of the wound fibers are fixed to the peripheral surface of the wound body by welding, bonding, etc.

It is preferable that the filter has a disk-shaped plate or the like disposed at an end face of the wound body (disposed at a height-direction end face in cases when the wound body is cylindrical).

The filter may include a casing in which the wound body is contained.

The filter including a wound body is explained in more detail. The filter 16 illustrated in FIG. 1 includes a core 13 and fibers 11. The core 13 is a hollow member which has an open top and a closed bottom. The core 13 has a plurality of holes 14 formed in the side face. The fibers 11 have been wound around the core 13 to form a wound body 10.

The filter 16 further includes a casing 17 in which the wound body 10 is contained. The casing 17 has an opening (not shown) formed in the top thereof so that feed water comes into the core 13 via the opening of the casing 17 and the top opening of the core 13. The casing 17 has a plurality of holes (not shown) formed in the side face thereof so that a permeate flows out from the filter via these holes.

Although FIG. 1 illustrates that water flows from inside the wound body 10 toward the outside thereof, the flow of water may be reversed. Namely, it is possible to supply water to the side face of the wound body and collect the permeate through the core. In this case, the casing 17 illustrated in FIG. 1 may be, for example, a casing in which a lower part thereof has an opening through which water can be supplied to between the wound body 10 and the inner wall of the casing 17 and the top thereof has an opening through which the permeate that has passed through the top opening of the core 13 can be taken out.

In cases when the wound body has a dislocation width δ (m), which will be described later, of up to 2 times the fiber diameter (yam diameter), an even porous structure is obtained.

Next, the filter including a stack of sheets of woven or knitted fabric is explained.

The term "stack" means a state in which sheets of woven fabric or knitted fabric or of both have been stacked. Woven fabric and knitted fabric are hereinafter sometimes called "woven fabric or the like". The filter 26 illustrated in FIG. 2 includes stacked sheets of woven fabric or the like (designated by numeral 21) and a column 25.

Figure 2:
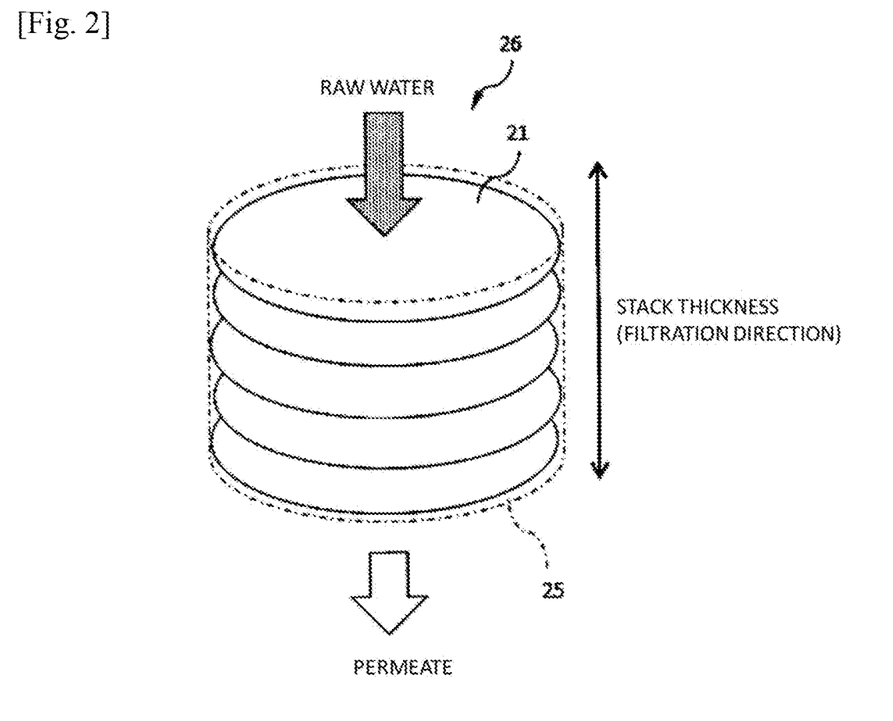
FIG. 2 is a schematic view illustrating an example of the filter including a stacked pair of woven or knitted fabric.

The column 25 is a vessel which has an open top and an open bottom so that the vessel contains woven fabric or the like 21 inside and that the vessel receives feed water and discharges the permeate. In many cases, the diameter of the bottom hole is set at a value smaller than the diameter of the column in order that the woven fabric or the like 21 be retained.

Matters common between the wound fibers and the stacked sheets of woven fabric or the like are described below.

The filtration-direction thickness of the layer of packed fibers can be determined at will in accordance with the amount of raw water which is desired to be filtered. However, the thickness thereof is preferably 5 mm or larger, more preferably 10 mm or larger, even more preferably 20 mm or larger. In cases when the thickness thereof is 5 mm or larger, raw water is prevented from short-cutting and a component to be removed from the raw water can be advantageously removed. The layer of packed fibers is the layer of fibers formed by winding or stacking. This layer is called a "packed layer".

The fibers in a wet state have a density $\rho$ of preferably 1.0 g/cm$^3$ or higher. The density $\rho$ of the fibers is preferably 1.5 g/cm$^3$ or less. The density $\rho$ of the fibers may be 1.1 g/cm$^3$ or higher and may be 1.3 g/cm$^3$ or less.

The density $\rho$ is the mass per unit volume of the fibers which are in a wet state under no load. For example, the density $\rho$ is determined in the following manner.

The wound body or knitted or woven fabric included in a filter is loosened to obtain the yarns. A vessel for measurement having a known capacity Vt (cm$^3$) is immersed in water, and the yarns are placed in the vessel. The density $\rho_a$ (g/cm$^3$) is calculated from the capacity Vt (cm$^3$) of the vessel, the volume Vw (cm$^3$) of the water in the vessel, and the mass Wa (g) of the fibers using the following equation.

$$\rho_a = Wa/(Vt-Vw) \quad (1)$$

Wa (g): mass of wet-state fibers (yarns)
Vt (cm$^3$): capacity of vessel for measurement
Vw (cm$^3$): volume of water present in the vessel for measurement (Vt−Vw) indicates the volume Va (cm$^3$) of the fibers (yarns). The volume of water Vw (cm$^3$) is the same as the mass of the water Ww (g), and the mass of the water Ww can be determined by measuring the total mass Wt (g) of the water and fibers (yarns) in the vessel and subtracting the mass of the fibers (yarns) Wa (g) from the Wt (g).

The mass Wa (g) of the wet-state fibers (yarns) can be obtained by taking the fibers out of the vessel, removing the adherent water therefrom by suction filtration, and then measuring the mass of the fibers (yarns).

The porosity $\varepsilon$ (%) of the filter is 15% or higher, preferably 30% or higher. The porosity $\varepsilon$ thereof is 70% or less, preferably 60% or less, more preferably 50% or less. Since the porosity $\varepsilon$ thereof is 15% or higher, the filter is less apt to be clogged in water passing and to have increased water-passing resistance. Since the porosity $\varepsilon$ thereof is 70% or less, raw water passes through the filter without short-cutting and, hence, a component to be removed from the raw water can be advantageously removed. In addition, a sufficient amount of permeate can be obtained before breakthrough occurs.

The porosity $\varepsilon$(%) of the filter can be calculated with the following equation.

$$\varepsilon(\%) = (Vf - Wb/\rho_a)Vf \times 100 \quad (2)$$

Vf (cm$^3$): volume of packed layer; namely, sum of the volume of packed fibers and the volume of spaces among the fibers
Wb/$\rho_a$ (cm$^3$): volume of the fibers
(Vf−Wb/$\rho$(cm$^3$): volume of interstices
Wb (g): mass of the wet-state fibers included in the filter
$\rho_a$ (g/cm$^3$): density of the wet-state fibers (yarns)

Vf (cm$^3$) is the apparent volume of the stacked sheets of fibers or the wound fiber body. However, in cases when the fibers have been packed into the entire column, the capacity of the column can be regarded as the volume Vf. In the case of a cylindrical wound fiber body including a core disposed inside, the Vf can be calculated by subtracting the volume of the core from the volume (R$^2$×$\pi$×H) calculated from the radius R and height H of the wound body.

The variation in areal porosity of the filter is 15% or less, preferably 10% or less. Since the variation in areal porosity thereof is 15% or less, eddy currents are less apt to occur in water passing and the filter is less apt to have increased water-passing resistance.

In the case where the filter includes stacked sheets of woven or knitted fabric, the term "variation in areal porosity" means the variation along the stack-thickness direction of the woven or knitted fabric (FIG. 2). In the case where the filter includes a wound fiber body, the term "variation in areal porosity" means the variation in areal porosity along the radial direction of winding (FIG. 1). The variation in areal porosity can be also regarded as the variation in areal porosity along the direction of liquid filtration (the direction in which a liquid passes) in the filter (FIG. 1, FIG. 2). The radial direction of winding, stack-thickness direction, and filtration direction are inclusively referred to as "thickness direction".

A method for determining the variation in areal porosity is as follows. A plurality of slices (sections) which are perpendicular to the thickness direction and are parallel with each other are photographed to obtain images thereof by X-ray CT scanning. The resolution (m/pixel) is set at ¹⁄₂₀ the fiber diameter (yarn diameter) D, and the size of the field of view is set at 512 (pixels)×512 (pixels). The packed layer is scanned while shifting the position from the center of the thickness thereof at intervals equal to the resolution of the two-dimensional images to obtain 256 images along each of the backward and forward directions, thereby obtaining 512 images in total. Namely, sections are photographed over a thickness of 512 (pixels) while shifting the position by 1 (pixel) at a time. In the case where the thickness is less than 512 (pixels), only the images of portions where the fibers are present are used for calculating the variation.

The two-dimensional images obtained were each binarized, and the areal proportion (%) of void regions to the whole area of each image is defined as areal porosity. The areal porosity is plotted along the direction of variation examination and an approximate straight line is calculated by the least square method. With respect to each position, the value on the approximate straight line of areal porosity is subtracted from the measured value of areal porosity, thereby determining a deviation in areal porosity at the position from the approximate straight line. The variation in areal porosity is defined as the difference between the maximum deviation and minimum deviation from the approximate straight line of areal porosity along the direction of variation examination.

4. Water Purifier

The filter described above can be applied to water purifiers. A water purifier is a structure capable of removing the object components contained in raw water. The inclusion of the filter renders the water purifier suitable for removing a component to be removed from raw water and makes it possible to obtain a sufficient amount of a permeate before break-through occurs.

The shape of the water purifier is not limited and may be the pot type, tap type, etc.

5. Method for Water Purification

The filter described above is suitable for water purification. The method for water purification is only required to include passing raw water through the filter. Suitable for use as the raw water is water. Examples thereof include tap water. The filter described above is especially suitable for use in removing metal ions from water. Examples of the metal ions include hardness components and heavy-metal ions. Examples of the hardness components include calcium ions and magnesium ions. The term "heavy-metal ions" means metallic elements having a specific gravity of 4 or higher. Specific examples thereof include lead, mercury, arsenic, copper, cadmium, chromium, nickel, manganese, cobalt, and zinc.

In the case of the wound body illustrated in FIG. 1, raw water enters the perforated core 13 through the top of the casing 17, passes through the holes 14 formed in the side face of the perforated core 13, and moves to the wound body 10. During the period when the raw water passes through the interstices among the yarns 11 of the wound body 10, a solute contained in the raw water is removed. The permeate flows from the side face of the wound body to the space between the wound body and the casing 17 and flows out from the casing 17 through a takeout port (not shown) disposed in the bottom of the casing 17. In the wound body 11, the radial direction is the same as the filtration direction as illustrated in FIG. 1.

In the filter 26 illustrated in FIG. 2, which includes stacked sheets of woven fabric or the like 21, the raw water supplied through the top of the column 25 moves while crossing the stacked sheets of woven fabric or the like 21, during which a solute contained in the raw water is removed. The permeate flows out through a takeout port disposed in the bottom of the column 25.

6. Process for Producing Fibers Capable of Adsorbing Component Dissolved in Liquid Next, a process for producing fibers capable of adsorbing a component dissolved in a liquid is described. First, a process for producing the ion-exchange fibers is described. A step for adhering a crosslinked high-molecular-weight compound having ion-exchange groups to fiber structures include:

(1) a step in which the fiber structures are brought into contact with an aqueous solution containing both a high-molecular-weight compound having carboxy groups and a compound having two or more functional groups reacting with carboxy group,
(2) a step in which, after the step (1), the excess aqueous solution adherent to the fiber structures is removed, and
(3) a step in which, after the step (2), the fiber structures which hold the aqueous solution containing both a high-molecular-weight compound having carboxy groups and a compound having two or more functional groups reacting with carboxy group is heated.

In the step (1) above, fiber structures are brought into contact with an aqueous solution containing both a high-molecular-weight compound having carboxy groups and a compound having two or more functional groups reacting with carboxy group, thereby adhering the aqueous solution to the fiber structures. Specifically, use can be made of a method in which the fiber structures are immersed in the aqueous solution or a method in which the aqueous solution is applied to the fiber structures using a coater, roller, spray, etc.

In this step, the concentration of the high-molecular-weight compound having carboxy groups in the solution is preferably 250 g/L or higher, more preferably 300 g/L or higher. In cases when the concentration thereof is 250 g/L or higher, carboxy groups can be given in a necessary amount on the fibers. The concentration of the high-molecular-weight compound having carboxy groups in the solution is preferably 550 g/L or less, more preferably 500 g/L or less. In cases when the concentration thereof is 550 g/L or less, the high-molecular-weight compound having carboxy groups evenly dissolves in the solution.

The concentration of the compound having two or more functional groups reacting with carboxy group, in the solution, is preferably 10 g/L or higher, more preferably 50 g/L or higher. In cases when the concentration of the compound having two or more functional groups reacting with carboxy group, in the solution, is 10 g/L or higher, a crosslinking reaction proceeds sufficiently and, hence, the completed ion-exchange fibers can be inhibited from releasing the high-molecular-weight compound having carboxy groups into water. Meanwhile, the concentration of the compound having two or more functional groups reacting with carboxy group, in the solution, is preferably 200 g/L or less, more preferably 100 g/L or less. In cases when the concentration thereof is 200 g/L or less, the crosslinking reaction does not proceed excessively and carboxy groups can be caused to remain in a preferable amount as the ion-exchange fibers.

In the step (2) above, examples of methods for removing the excess aqueous solution adherent to the fibers include a method in which the solution is removed using a nozzle. As a method for removing the excess aqueous solution adherent to the fiber structures, use can be made of a method in which the solution is removed using rubber rollers. e.g., a mangle, or a method in which air is blown with an air nozzle or the like to remove the solution.

In the step (3) above, as a method for heating the fiber structures, use can be made of a method of heating in a heating device such as an oven or a pin tenter or a method in which hot air is blown using a dryer or the like.

In this step, the temperature at which the fiber structures are heated is preferably 100° C. or higher, more preferably 130° C. or higher. In cases when the temperature is 100° C. or higher, the high-molecular-weight compound having carboxy groups can crosslink with the compound having two or more functional groups reacting with carboxy group. Meanwhile, the heating temperature is preferably 250° C. or lower, more preferably 200° C. or lower. In cases when the heating temperature is 250° C. or lower, the fiber structures can retain the shape thereof.

It is preferable that the period during which the fiber structures are heated in this step is suitably regulated in accordance with the water content of the solution with which the fiber structures are coated. However, heating is performed preferably for 1 minute or longer, more preferably 3 minutes or longer. In cases when the heating period is 1 minute or longer, the crosslinking reaction proceeds sufficiently so that the high-molecular-weight compound having carboxy groups can be inhibited from being released into water. Meanwhile, the heating period is preferably 30 minutes or less, more preferably 10 minutes or less. In cases when the heating period is 30 minutes or less, this step can be carried out at a reduced cost.

For winding the fibers around the periphery of a perforated core, use may be made of a method in which the fibers begin to be wound around a rotating perforated core while the yarn guide nearest to the perforated core is being moved relative to the perforated core in parallel with the axis direction thereof, thereby making it possible to wind the fibers so as to make a lead angle. The yarn guide, which regulates the yarn passage, may be moved in parallel or the rotating perforated core may be moved in parallel relative to the yarn guide which is fixed.

At the time when the fibers have been wound to one end of the perforated core, the direction of the parallel movement is reversed. Thus, the yarn is wound over in the reverse direction toward the other end. This reciprocating motion is continuously repeated, thereby gradually winding the fibers over and thick and thus forming a cylindrical packed layer.

When the dislocation width of the fibers wound in the period from the (n+2)th reversal from initiation of the winding to the (n+3)th reversal with respect to the fibers wound in the period from the n-th reversal to the (n+1)th reversal is indicated as δ (m), δ (m) is preferably up to 2 times the fiber diameter, more preferably up to 1.5 times the fiber diameter. In cases when the δ (m) is up to 2 times the fiber diameter, the fibers can be stacked up while maintaining even interstices. The δ (m) is preferably at least 0.1 time the fiber diameter, more preferably at least 0.5 times the fiber diameter. In cases when the δ (m) is at least 0.1 time the fiber diameter, the overlapping of the fibers wound in the period from the n-th reversal from initiation of the winding to the (n+1)th reversal with the fibers wound in the period from the (n+2)th reversal to the (n+3)th reversal can be reduced and raw water can be inhibited from short-cutting.

The lead angle θ is expressed by the traverse speed St (m/s), which is the rate at which the perforated core and the yarn passage make the relative parallel movement, and the yarn winding-up speed Sr (m/s), and can be calculated with the following equation.

$$\theta = \tan^{-1}(St/Sr) \quad \text{(equation 1)}$$

The ratio between the traverse frequency ht (cpm), which is the number of reversals per unit time period, and the rotational speed r (rpm) of the perforated core is called wind ratio W and is defined by the following equation.

$$W = r/ht$$

In cases when the part after the decimal point of the wind ratio is expressed by W1 and the outer diameter of the wound body including the perforated core is expressed by R (m), then the dislocation width δ (m) is defined by the following equation.

$$\delta = W1 \times R \times \pi \times \sin(\theta)$$

In the case where the wind ratio W is an integer, namely, when W1=0, the dislocation width δ (m) is 0 m. In cases when the winding is conducted while keeping the wind ratio W constant, the dislocation width δ (m) is always constant. It is preferable that the dislocation width is even from the inside to the outer periphery of the wound fiber body.

The step in which fiber structures are coated with a crosslinked high-molecular-weight compound having ion-exchange groups or the step in which a crosslinked high-molecular-weight compound having ion-exchange groups is adhered to interstices among the single fibers of fiber structures may be performed either before or after the step of processing the fiber structures into the state of woven or knitted fabric.

EXAMPLES

The present invention is explained below in more detail by reference to Examples, but the present invention should not be construed as being limited by the following Examples.

<Fiber Diameter D, Opening Size Op>

Woven or knitted fabric or yarns were immersed in RO water (reverse-osmosis filtrate water) for 24 hours and then examined with a microscope to measure the diameters of ten fibers. An average of these was taken as the fiber diameter (yarn diameter). In the case where the woven or knitted fabric was one configured of bundles of a plurality of filaments, the diameters of the fiber bundles were measured.

In the case of woven fabric, the gap between warps and the gap between wefts were measured with a microscope at ten portions each, and an average of the measured values was taken as the opening size of the fibers.

<Density $\rho_a$ of Wet-state Fibers>

Woven or knitted fabric or a wound body was loosened to obtain yarns. In water, the yarns were packed into a column with a diameter of 40 mm and a height of 20 mm (capacity Vt =25.12 cm$^3$) up to the brim of the column without applying any load to the yarns, and the column was closed. This column was taken out of the water, and the water adherent to the outer surfaces of the column was wiped off. Thereafter, the column was opened, and the total mass Wt (g) of the water and yarns inside was measured. Subsequently, the water adherent to the yarns was removed by suction filtration, and the mass Wa (g) of the wet-state yarns was measured. The value of [Wt (g)]−[Wa (g)], that is, the mass Ww (g) of the water which had been present in the interstices of the packed layer, was calculated.

The density $\rho_a$ of the fibers was calculated using the following equation.

$$\rho_a = Wa/(Vt-Vw) \quad (1)$$

Wa (g): mass of wet-state fibers
Vt (cm$^3$): capacity of vessel for measurement
Vw (cm$^3$): volume of water present in the vessel for measurement <Porosity ε of Filter>

The porosity ε(%) of a filter was calculated with the following equation.

$$\varepsilon(\%) = (Vf - Wb/\rho_a)/Vf \times 100 \quad (2)$$

Vf (cm$^3$): volume of packed (stacked or wound) fiber layer; namely, sum of the volume of packed fibers and the volume of spaces among the fibers
Wb/$\rho_a$ (cm$^3$): volume of the fibers
(Vf−Wb/ρ) (cm$^3$): volume of interstices
Wb (g): mass of the wet-state fibers included in the filter
$\rho_a$ (g/cm$^3$): density of the wet-state fibers In the Examples and Comparative Examples, in cases when a column having a diameter of 40 mm and a thickness of 20 mm was used, the volume Vf was 25.12 cm$^3$. In the case of a cylindrical wound fiber body including a core disposed inside, the volume Vf was calculated by subtracting the volume of the core from the volume {(R/2)$^2 \times \pi \times$H} calculated from the outer diameter R and height H of the wound body.

<Variation in Areal Porosity>

A filter was immersed in water, and air was then passed therethrough to remove the water present in the interstices among the fibers of the packed layer. Next, the packed layer was examined by X-ray CT scanning to obtain two-dimensional images perpendicular to the thickness direction of the packed layer.

The resolution (m/pixel) was set at ½₀ the fiber diameter D, and the size of the examined field of view was set at 512 (pixels)×512 (pixels). The packed layer was scanned while shifting the position from the center of the thickness thereof at intervals equal to the resolution of the two-dimensional images to obtain 256 images along each of the backward and forward directions, thereby obtaining 512 images in total. In the case where the thickness is less than 512 (pixels), only the images of portions where the fibers had been present were used for calculating the variation.

The two-dimensional images obtained were each binarized, and the areal proportion (%) of void regions to the whole area of each image was defined as areal porosity. The areal porosity was plotted along the thickness direction and an approximate straight line was calculated by the least square method. Next, with respect to each position, the value on the approximate straight line of areal porosity was subtracted from the measured value of areal porosity, thereby determining a deviation in areal porosity at the position from the approximate straight line. The variation in areal porosity was defined as the difference between the maximum deviation and minimum deviation from the approximate straight line of areal porosity measured along the thickness direction.

<Initial Removal Ratio, Filtration Ability>

An aqueous solution having a calcium chloride concentration of 2 mmol/L and a sodium hydrogen carbonate concentration of 2 mmol/L was used as raw water to measure a calcium-ion removal ratio. The raw water was passed through the filter at a space velocity SV of 500 ($hr^{-1}$).

The permeate was sampled in an amount of 10 mL every time when the raw water had passed through the filter in an amount of 10 bed vol., and the calcium ion concentration in the permeate was determined by ICP-AES (inductively coupled plasma-atomic emission spectrometry) to calculate the calcium-ion removal ratio. "bed vol." is a value obtained by dividing the volume of the permeate by the volume of the packed layer.

The calcium-ion removal ratio determined after the raw water had passed in an amount of 10 bed vol. was taken as "initial removal ratio", and the value of bed vol. which was obtained when the calcium-ion removal ratio had become 50% was taken as "filtration ability".

<Water-passing Resistance>

Pure water was passed through a filter to determine the pressure loss, which was the difference between the filter inlet pressure and the filter outlet pressure. A value "A" (Pa/m) obtained by dividing the pressure loss by the thickness of the packed layer was determined while changing the permeate flow rate (m/s). Next, water was passed through the device containing no sample charged therein, and a value "B" obtained by dividing the resultant pressure loss by the thickness of the packed layer was determined while changing the permeate flow rate. The value B was subtracted from the value A, and a relationship between a value obtained by dividing the pressure loss of the sample by the thickness of the packed layer and the flow rate was plotted. Thus, a directly proportional relationship was ascertained. From the inclination of this straight line, the water-passing resistance ($Pa \cdot s/m^2$) of the sample in the packed layer was determined.

<Impartation of Ion-exchange Ability to Fibers>

Reference Example 1

Impartation of Ion-exchange Ability to Woven or Knitted Fabric

About 10 g of woven or knitted fabric configured of PET fibers was immersed in 1 L of an aqueous solution containing 33% by mass poly(acrylic acid) 25,000 (manufactured by Wako Pure Chemical Industries, Ltd.) and 15% by mass polyglycerol polyglycidyl ether (EX-512, manufactured by Nagase ChemteX Corp.). Subsequently, this fabric was treated with a mangle to remove the solution therefrom and heated at 130° C. for 3 minutes. The resultant woven or knitted fabric was rinsed with running water and dried by reheating at 130° C. for 3 minutes. The immersion of the woven or knitted fabric in the solution, solution removal, heating, rinsing, and drying were taken as one cycle, and three cycles were performed. The ion-exchange-fiber woven or knitted fabric obtained was immersed for 1 hour in a 0.1 mol/L aqueous solution of sodium hydroxide to convert the carboxy groups into the sodium form. Furthermore, this fabric was rinsed with RO water until the rinse water came to have a pH of 8 or less.

Reference Example 2

About 10 g of PET fibers were immersed in 1 L of an aqueous solution having the same composition as in Reference Example 1, which contained the poly(acrylic acid) and the polyglycerol polyglycidyl ether. Subsequently, the fibers were treated with a nozzle having a diameter of 430 μm to remove the solution therefrom and heated at 130° C. for 3 minutes. The resultant fibers were rinsed with running water and dried by reheating at 130° C. for 3 minutes. The immersion of the fibers in the solution, solution removal, heating, rinsing, and drying were taken as one cycle, and three cycles were performed. The fibers were wound around a perforated core. The thus-obtained wound body of the ion-exchange fibers was immersed for 1 hour in a 0.1 mol/L aqueous solution of sodium hydroxide to convert the carboxy groups into the sodium form. Furthermore, the wound body was rinsed with RO water until the rinse water came to have a pH of 8 or less.

Example 1

Using 84-dtex 72-filament PET fibers, knitted fabric was produced with a 22-gauge circular knitting machine. Ion-exchange ability was imparted to the knitted fabric by the method described in Reference Example 1 to produce knitted fabric configured of ion-exchange fibers having the fiber diameter shown in Table 1. Sheets of the knitted fabric obtained were stacked in a column having a diameter of 40 mm and a thickness of 20 mm, the number of the sheets being two times that in Comparative Example 1, which will be given later, and this column was closed. The performances are shown in Table 1.

Example 2

Using 215-μm 40-filament PET fibers, woven fabric in which the number of meshes was 42 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Example 3

Using 318-μm 40-filament PET fibers, woven fabric in which the number of meshes was 17 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Example 4

Using 60-μm 40-filament PET fibers, woven fabric in which the number of meshes was 80 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Example 5

Using 90-μm 40-filament PET fibers, woven fabric in which the number of meshes was 94 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Example 6

Ion-exchange ability was imparted to 215-μm 40-filament PET fibers by the method described in Reference Example 2 to produce ion-exchange fibers having the fiber diameter shown in Table 1. Subsequently, the ion-exchange fibers were wound around a perforated core with an outer diameter of 42 mm under the conditions of a traverse width of 110 mm, a traverse speed of 8 mm/s, and a spindle rotational speed of 105 rpm, thereby producing a wound body having an outer diameter of 62 mm and a height of 110 mm. The performances are shown in Table 1.

Comparative Example 1

Using 84-dtex 72-filament PET fibers, knitted fabric was produced with a 22-gauge circular knitting machine. Ion-exchange ability was imparted to the knitted fabric by the method described in Reference Example 1 to produce knitted fabric configured of ion-exchange fibers having the fiber diameter shown in Table 1. In water, sheets of the thus-obtained knitted fabric configured of the ion-exchange fibers were stacked in a column with a diameter of 40 mm and a thickness of 20 mm up to the brim of the column without imposing any load on the sheets, and this column was closed. The performances are shown in Table 1.

Comparative Example 2

Using 318-μm 40-filament PET fibers, woven fabric in which the number of meshes was 10 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Comparative Example 3

Using 60-μm 40-filament PET fibers, woven fabric in which the number of meshes was 49 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Comparative Example 4

Using 20-μm 40-filament PET fibers, woven fabric in which the number of meshes was 420 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Comparative Example 5

Using 20-μm 40-filament PET fibers, woven fabric in which the number of meshes was 230 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Comparative Example 6

Using 500-μm 40-filament PET fibers, woven fabric in which the number of meshes was 18 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Comparative Example 7

Using 500-μm 40-filament PET fibers, woven fabric in which the number of meshes was 14 (per inch) for each of warp and weft was produced with a plain-weaving machine. Ion-exchange ability was imparted to the woven fabric by the method described in Reference Example 1 to produce woven fabric configured of ion-exchange fibers having the fiber diameter shown in Table 1. In water, sheets of the thus-obtained woven fabric configured of the ion-exchange fibers were stacked in a column with a diameter of 40 mm and a thickness of 20 mm up to the brim of the column without imposing any load on the sheets, and this column was closed. The performances are shown in Table 1.

Comparative Example 8

Ion-exchange ability was imparted to 215-μm 40-filament PET fibers by the method described in Reference Example 2 to produce ion-exchange fibers having the fiber diameter shown in Table 1. Subsequently, the ion-exchange fibers were wound around a perforated core with an outer diameter of 42 mm and a length of 110 mm under the conditions of a traverse speed of 8 mm/s and a spindle rotational speed of 104 rpm, so as to result in the same shape as in Example 6. The performances are shown in Table 1.

As Table 1 shows, Examples 1 to 6 were superior to Comparative Examples 1 to 8 in initial removal ratio, filtration ability, and water-passing resistance although the same fibers were used. It is thought that the higher the filtration ability, the longer the life.

While the present invention has been described in detail and with reference to specific embodiments thereof, it will be apparent to one skilled in the art that various changes and modifications can be made therein without departing from the spirit and scope of the present invention. This application is based on a Japanese patent application filed on Feb. 28, 2017 (Application No. 2017-036090), the entire contents thereof being incorporated herein by reference.

INDUSTRIAL APPLICABILITY

The filter of the present invention is suitable for use in removing components dissolved in water.

REFERENCE SIGNS LIST

10 Wound body
11 Fibers
13 Core
14 Hole
16 Filter
17 Casing
21 Woven fabric or the like
25 Column
26 Filter

The invention claimed is:
1. A filter comprising at least one of a stacked woven fabric, stacked knitted fabric and a wound fiber body, the woven fabric, the knitted fabric and the wound fiber body satisfying the following requirements (a) and (b):
(a) comprising a fiber capable of adsorbing a component dissolved in a liquid; and
(b) the fiber having a diameter D of 100 μm or more and 600 μm or less,
and the filter satisfying the following requirements (c) and (d):
(c) having a porosity of 15% or more and 70% or less; and

TABLE 1

| | | Performances | | | | | | | | | | |
|---|---|---|---|---|---|---|---|---|---|---|---|---|
| | Form | Initial removal ratio (%) | Filtration ability (bed vol.) | Water-passing resistance (×10$^6$ Pa·s/m$^2$) | Number of meshes n (per inch) | Opening size op (μm) | Fiber diameter D (μm) | op/D (—) | Fiber density $\rho_a$ (g/cm$^3$) | Basis weight (g/m$^2$) | Porosity ε (%) | Variation in areal porosity (%) |
| Example 1 | knitted fabric | 79.6 | 122 | 2.6 | — | — | 593 | — | 1.10 | 793 | 39.2 | 14.0 |
| Example 2 | woven fabric | 90.9 | 168 | 4.19 | 42 | 205 | 398 | 0.52 | 1.12 | 588 | 34.6 | 4.2 |
| Example 3 | woven fabric | 65.5 | 85 | 0.14 | 17 | 898 | 596 | 1.51 | 1.09 | 518 | 60.1 | 4.0 |
| Example 4 | woven fabric | 80.9 | 72 | 0.22 | 80 | 210 | 108 | 1.94 | 1.13 | 83 | 66.0 | 3.9 |
| Example 5 | woven fabric | 98.9 | 92 | 13.9 | 94 | 104 | 150 | 0.69 | 1.10 | 195 | 41.0 | 4.8 |
| Example 6 | wound body | 92.1 | 160 | 7.59 | — | — | 401 | — | 1.07 | — | 34.6 | 8.9 |
| Comparative Example 1 | knitted fabric | 39.3 | — | 0.03 | — | — | 588 | — | 1.20 | 207 | 85.3 | 9.2 |
| Comparative Example 2 | woven fabric | 41.1 | — | 0.03 | 10 | 1963 | 577 | 3.40 | 1.12 | 293 | 77.3 | 3.9 |
| Comparative Example 3 | woven fabric | 58.3 | 9 | 0.48 | 49 | 407 | 101 | 4.03 | 1.11 | 45 | 80.1 | 6.2 |
| Comparative Example 4 | woven fabric | 99.8 | 86 | 285 | 420 | 23 | 37 | 0.62 | 1.04 | 47 | 38.8 | 4.2 |
| Comparative Example 5 | woven fabric | 83.9 | 80 | 20.1 | 230 | 69 | 41 | 1.68 | 1.08 | 33 | 62.9 | 5.1 |
| Comparative Example 6 | woven fabric | 57.3 | 36 | 0.45 | 18 | 599 | 812 | 0.74 | 1.09 | 1018 | 42.5 | 5.3 |
| Comparative Example 7 | woven fabric | 59.9 | 25 | 0.12 | 14 | 998 | 790 | 1.26 | 1.10 | 756 | 56.5 | 4.9 |
| Comparative Example 8 | wound body | 87.8 | 155 | 25.9 | — | — | 410 | — | 1.09 | — | 35.9 | 21.9 |

(d) having a variation in an areal porosity of 15% or less, in a stack thickness direction in a case when the filter comprises the woven fabric or knitted fabric, or in a radial direction in a case when the filter comprises the wound fiber body.

2. A filter for liquid filtration, comprising at least one of a stacked woven fabric, stacked knitted fabric and a wound fiber body, the woven fabric, the knitted fabric and the wound fiber body satisfying the following requirements (a) and (b):

(a) comprising a fiber capable of adsorbing a component dissolved in a liquid; and (b) the fiber having a diameter D of 100 μm or more and 600 μm or less, and the filter satisfying the following requirements (c) and (d):

(c) having a porosity of 15% or more and 70% or less; and (d) having a variation in an areal porosity of 15% or less in a direction along which the liquid is filtered, wherein said direction along which the liquid is filtered is in a stack thickness direction in a case when the filter comprises the woven fabric or knitted fabric or in a radial direction in a case when the filter comprises the wound fiber body.

3. The filter according to claim 1, wherein the woven fabric or knitted fabric has a basis weight of 300 g/m² or more and 1,500 g/m² or less.

4. The filter according to claim 1, comprising a woven fabric that satisfies the above (a) to (d) and satisfies the following expression:

$$0.5 \leq op/D \leq 3.0 \tag{1}$$

op: opening size of the woven fabric (μm)
D: fiber diameter (μm).

5. The filter according to claim 1, wherein the fiber in a wet state has a density of 1.0 g/cm³ or more and 1.50 g/cm³ or less.

6. The filter according to claim 1, wherein the fiber has ion-exchange ability.

7. A water purifier comprising the filter according to claim 1.

8. A method for purifying water, comprising passing the water through the filter according to claim 1.

* * * * *

UNITED STATES PATENT AND TRADEMARK OFFICE
CERTIFICATE OF CORRECTION

PATENT NO. : 10,662,083 B2
APPLICATION NO. : 16/489278
DATED : May 26, 2020
INVENTOR(S) : Ryoma Miyamoto et al.

Page 1 of 1

It is certified that error appears in the above-identified patent and that said Letters Patent is hereby corrected as shown below:

On the Title Page

Item (73) Assignee, please change:
"TORAY INDUSTRIES, Tokyo (JP)"
TO:
-- TORAY INDUSTRIES, INC., Tokyo (JP) --

Signed and Sealed this
Twenty-seventh Day of October, 2020

Andrei Iancu
*Director of the United States Patent and Trademark Office*